United States Patent [19]

Savidan

[11] 4,168,635
[45] Sep. 25, 1979

[54] OUTSIDE, REMOTE-CONTROLLED, REARVIEW MIRROR
[75] Inventor: Bernard Savidan, Meudon, France
[73] Assignee: Regie Nationale des Usines Renault, Boulogne-Billancourt, France
[21] Appl. No.: 845,580
[22] Filed: Oct. 26, 1977
[30] Foreign Application Priority Data
Oct. 26, 1976 [FR] France .................. 76 32201
[51] Int. Cl.² .......................... F16C 1/10
[52] U.S. Cl. ..................... 74/501 M; 74/801; 350/288
[58] Field of Search ............ 74/501 M, 801; 350/288, 350/289; 248/208; 15/250.31
[56] References Cited

U.S. PATENT DOCUMENTS

| 2,294,986 | 9/1942 | Hynek | 248/208 |
| 3,008,375 | 11/1961 | Henderson | 350/289 |
| 3,513,715 | 5/1970 | Whitfield | 74/801 |

FOREIGN PATENT DOCUMENTS 1398813 4/1965 France ................................ 350/289
355521 8/1931 United Kingdom .............. 15/250.31

Primary Examiner—Samuel Scott
Assistant Examiner—Wesley S. Ratliff, Jr.
Attorney, Agent, or Firm—Oblon, Fisher, Spivak, McClelland & Maier

[57] ABSTRACT

In a remote-controlled rearview mirror, particularly for motor vehicles, the mirror is mounted by a convex swivel element resting in a concave seat forming one piece with the assembly base. The seating has a central opening allowing passage of a shank extending the swivel and which fits into a reducer box where it is immobilized. The reducer box has a center axis, on which a freely rotating center pinion is mounted, being integral with the control lever, and the outer part of the pinion being smooth and freely rotatable in the center of a planet wheel carrier element which serves as a bearing therefor and which constitutes a cover for the reducer box. The planet wheel carrier includes three perpendicular axes, in the direction of the inside of the box, on which three differential pinions rest, gearing on the one hand into the center pinion and on the other hand into a toothed ring on the inside periphery of the box.

4 Claims, 4 Drawing Figures

OUTSIDE, REMOTE-CONTROLLED, REARVIEW MIRROR

BACKGROUND OF THE INVENTION

1. Field of the Invention

The present invention involves an outside rearview mirror for motor vehicles that is remote-controlled and is constituted by a mirror-mounting mobile around a mounting base containing a control mechanism equipped with a single lever, located inside the vehicle, which gears with the mirror-mounting.

2. Description of the Prior Art

Remote-controlled rearview mirrors are well known in the art, but are generally complex and require numerous parts for transmitting the movements which position the mirror.

SUMMARY OF THE INVENTION

The object of the present invention is to provide an outside rearview mirror which is constructed simply and solidly, can be accurately adjusted and be maintained reliably in the position selected.

BRIEF DESCRIPTION OF THE DRAWINGS

Various other objects, features and attendant advantages of the present invention will be more fully appreciated as the same becomes better understood from the following detailed description, when considered in connection with the accompanying drawings, in which like reference numerals designate like or corresponding parts, and wherein.

DETAILED DESCRIPTION OF THE PREFERRED EMBODIMENT

Figure 1:
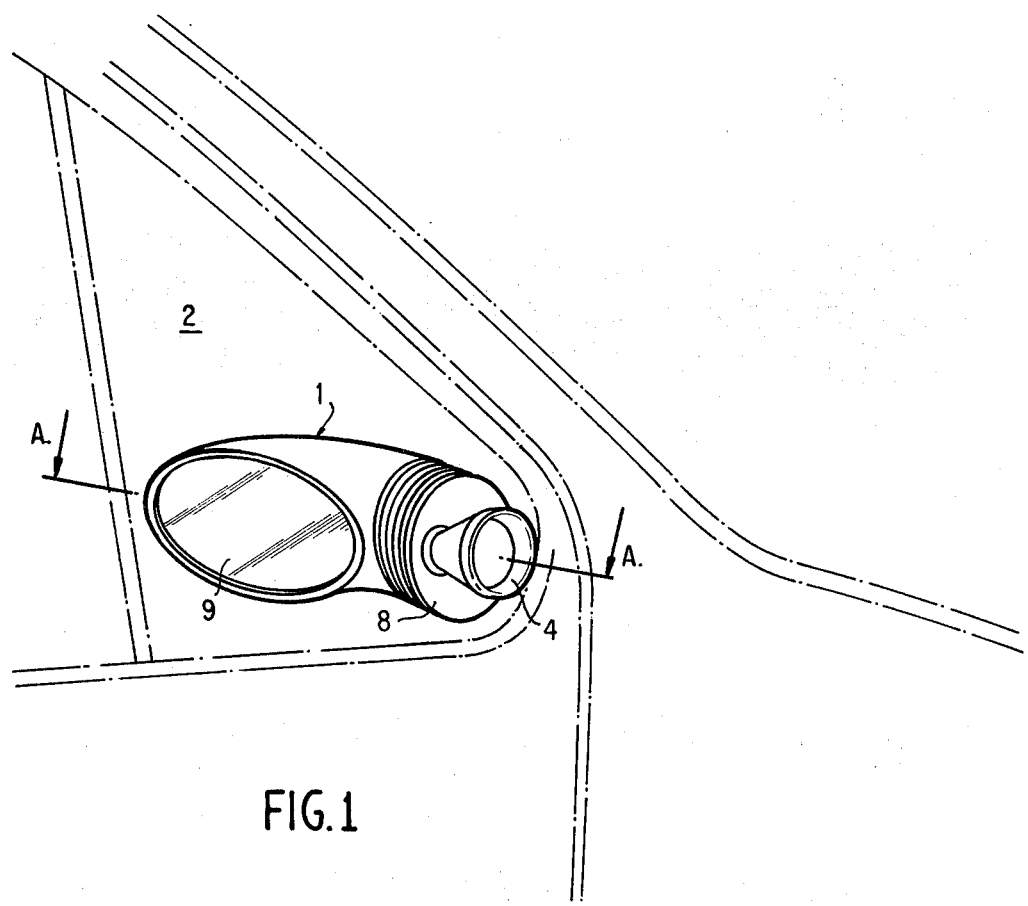
FIG. 1 is an overall view, in perspective, of the rearview mirror according to this invention being positioned on the vehicle.
Figure 3:
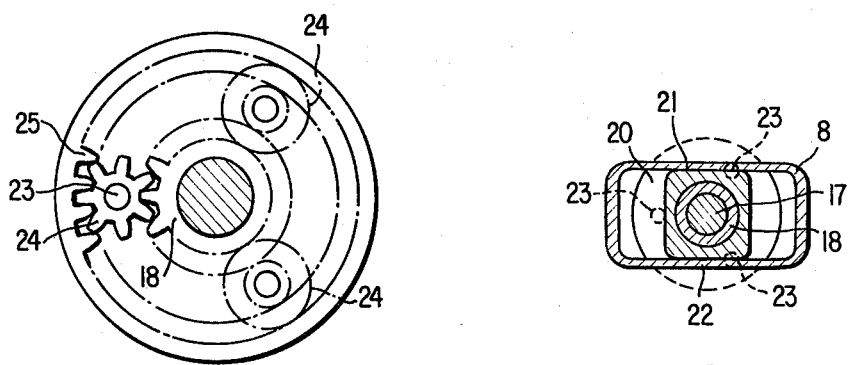
FIGS. 3 and 4 are sections respectively taken along the lines B—B and C—C of FIG. 2.
Figure 2:
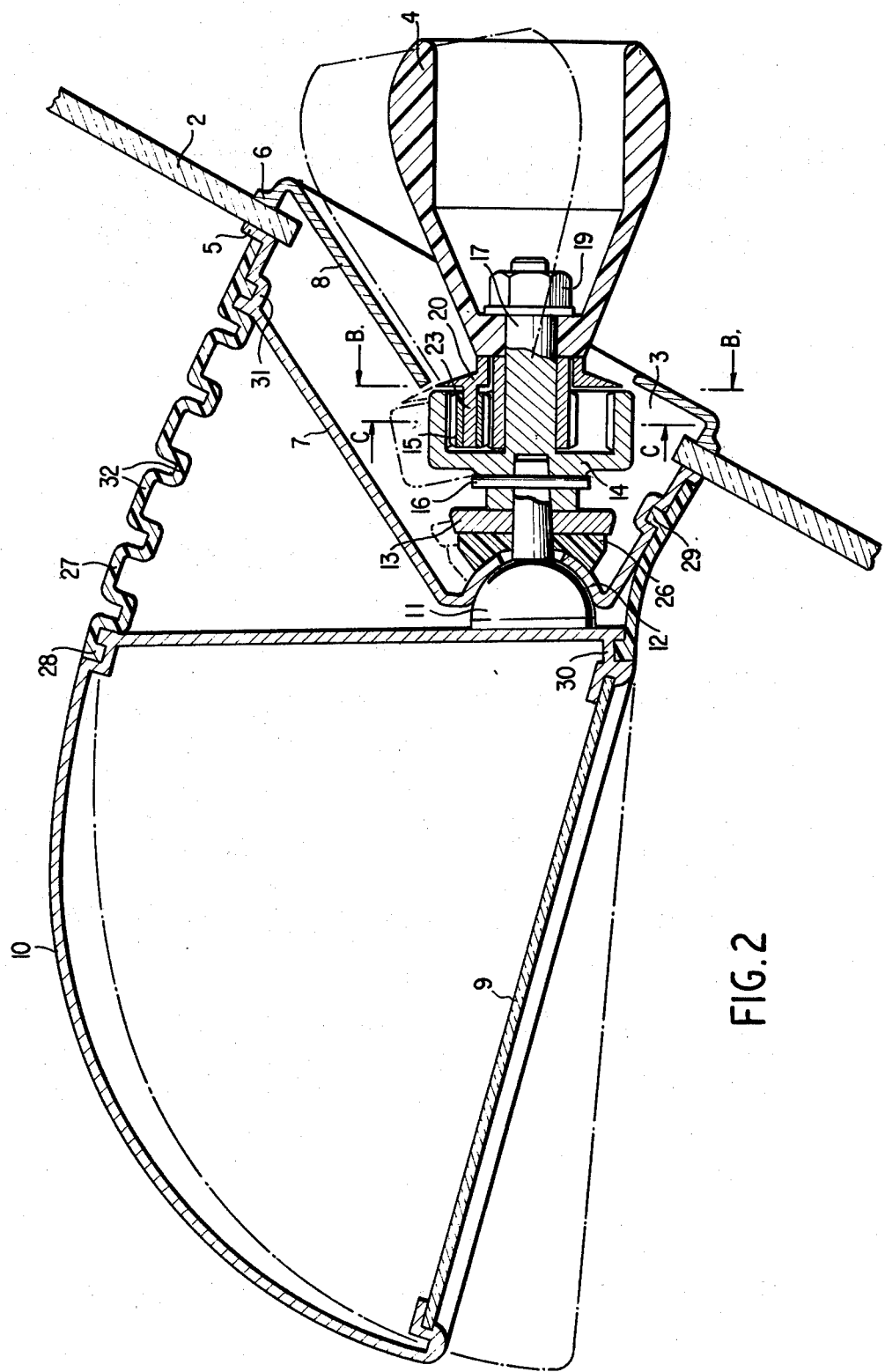
FIG. 2 shows a section along the line A—A of FIG. 1, or along a horizontal plane, revealing the control mechanism of the rearview mirror of this invention.

Referring now to the drawings, FIGS. 1 and 2 thereof illustrate the positioning of a mirror assembly 1 on a motor vehicle. It will be seen that the mirror assembly is arranged on the glass window 2 itself, after the latter has been pierced to provide a passageway 3 for the inside control lever 4 of the mirror. The mirror can be attached by any known means, particularly by gluing edges 5 and 6, respectively, of a base 7 and of a cover plate 8, or by fastening these two elements on both sides of the glass window.

Figure 4:
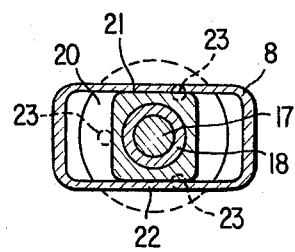

The mirror 9 and a mounting 10 therefor are formed as a unit with a convex swivel element 11 which moves in a concave seat 12 pierced in its center to allow the passage of a shank 13 of the swivel 11. The square section of the latter fits into a correspondingly shaped opening of a box 14 of a reducer element 15, whose purpose is to decrease the torque required at the lever 4 in order to position the mirror 9. A pin 16 connects the swivel shaft 13 to the box 14. The box 14 includes a center axis 17 whose extremity is threaded and on which a freely rotating center pinion 18 is mounted, being geared to box 14 on its inner part and smooth on its outer part. Its free end is attached to lever 4, and the entire assembly is locked by means of a nut 19. The smooth part of the center pinion 18 can turn freely in a planet wheel carrier 20, which serves as its bearing and which constitutes a cover for the reducer box, as seen in FIG. 4, the planet wheel carrier being fastened to cover plate 8 at 21 and 22.

Planet wheel carrier 20 has three axes 23 in planes which are perpendicular thereto and on which three differential pinions 24 can rotate freely. The latter pinions 24 gear into the center pinion 18 and into a toothed ring 25, being arranged on the inside periphery of box 14.

An element 26 is locked between the seat 12 of swivel 11 and box 14 before mounting on the vehicle and is used to attach the cover plate 8 by means, not shown in FIG. 2 because it is located in a vertical plane perpendicular to the cross-section. This mechanism is protected from outside influences by a flexible sheath 27 made of synthetic material, or an elastomer, the ends of which have peripheral flanges 28 and 29 fitting into correspondingly shaped grooves 30 and 31, respectively, located in the mirror mounting 10 and in the base 7. The front part of the flexible sheath 27 includes folds 32, constituting a reserve surface area for displacing the rearview mirror.

The operation of the rearview mirror according to the invention will now be described. A latitude of mirror movement of 10° forward and 10° backward is allowed in relation to its position of balance, illustrated by solid lines in FIG. 2, as well as a rotation of 20° on its horizontal axis, passing through the center axis 17 of box 14.

The forward and backward pivoting of the mirror, for example, in order to bring it into the position illustrated by broken lines, is obtained by actuating the lever 4 in a horizontal plane. This causes a relative movement of swivel 11 in its seat 12, being permitted by the width of the opening provided in the seat for the passage of the swivel shank 13.

So that the rearview mirror will not move freely from the position selected, it is sufficiently tightened before installation, causing some difficulty in moving the mirror. The length of lever 4 has been designed accordingly so that this operation can still be effected with ease.

The pivoting of the mirror around its horizontal axis is obtained by rotating lever 4 around the same axis, and since it is drivingly connected to center pinion 18, it therefore drives it in the same movement around center axis 17. The differential pinions 24 which gear into the center pinion 18 are thus placed in rotation around their axes 23 attached to planet wheel carrier 20, and kept motionless, since they are of one piece with cover plate 8 at 21 and 22.

Differentials 24 are also geared with ring 25 of box 14, the latter also being driven into rotation subsequent to the movement exerted on lever 4, but at a reduced ratio determined by the previously described planet gear and which is approximately 1 : 2. The planetary gear is preferably obtained by a molding of self-lubricating synthetic material, such as nylon.

Obviously, many modifications and variations of the present invention are possible in light of these teachings. It is therefore to be understood that within the scope of the appended claims, the invention may be practiced otherwise than as specifically described herein.

What is claimed as new and desired to be secured by letters patent of the United States is:

1. A remote-controlled rearview mirror, especially for motor vehicles, comprising:
   a base fixed to a window of said motor vehicle;
   a mirror-mounting, holding a mirror, attached to said base;
   a control mechanism, including a lever disposed within said motor vehicle and being connected to said mirror-mounting, for positioning said mirror;
   said connection of said lever and said mirror-mounting including a convex swivel element secured to said mirror-mounting and having a shank member extending therefrom toward the inside of said motor vehicle, a concave seat receiving said swivel element and being secured to said base, said seat having a center opening for passage therethrough of said shank member;
   a reducer box non-rotatably receiving said shank member and having a center axis extending therefrom being fixedly secured to said control lever;
   a freely rotating center pinion mounted upon said center axis of said reducer box; and
   a planet wheel carrier element constituting a cover for said reducer box in the center of which said center pinion is freely rotatable, said planet wheel carrier comprising, directed towards the inside of said reducer box, three perpendicular axes on which three differential pinions rest, gearing on the one hand into the center pinion and on the other hand into a toothed ring provided on the inside periphery of said reducer box.

2. A remote-controlled rearview mirror according to claim 1, wherein said base is attached to said window of said vehicle, passing through an opening provided therein for permitting passage of said control mechanism and said control lever, being affixed to both sides of the glass of said window.

3. A remote-controlled rearview mirror according to claim 2, wherein said base is fixed to both sides of the glass of said window by gluing.

4. A remote-controlled rearview mirror, especially for a motor vehicle, comprising:
   a base fixed to a window of said motor vehicle;
   a mirror-mounting, holding a mirror, attached to said base;
   a control mechanism, including a lever disposed within said motor vehicle and being connected to said mirror-mounting, for positioning said mirror;
   said connection of said lever and said mirror-mounting including a convex swivel element secured to said mirror-mounting and having a shank member extending therefrom toward the inside of said motor vehicle, a concave seat receiving said swivel element and being secured to said base, said seat having a center opening for passage therethrough of said shank member;
   a reducer box non-rotatably receiving said shank member and having a center axis extending therefrom being fixedly secured to said control lever;
   a freely rotating center pinion mounted upon said center axis of said reducer box;
   a planet wheel carrier element constituting a cover for said reducer box in the center of which said center pinion is freely rotatable, said planet wheel carrier comprising, directed towards the inside of said reducer box, three perpendicular axes on which three differential pinions rest, gearing on the one hand into the center pinion and on the other hand into a toothed ring provided on the inside periphery of said reducer box;
   said base is attached to said window of said vehicle passing through an opening provided therein for permitting passage of said control mechanism and said control lever, being fixed to both sides of the glass of said window; and
   a flexible sheath for protecting the control mechanism from outside influences, said sheath being made of synthetic material, the extremities of which have a peripheral flange, said flange fitting into grooves formed in the mirror-mounting and in the base, and the front part of said sheath including folds for providing a reserve surface area for permitting displacement of said mirror.

* * * * *